US012575015B2

(12) United States Patent
Ogi et al.

(10) Patent No.: US 12,575,015 B2
(45) Date of Patent: Mar. 10, 2026

(54) RADIATION IRRADIATION DEVICE

(71) Applicant: FUJIFILM Corporation, Tokyo (JP)

(72) Inventors: Kazuyuki Ogi, Kanagawa (JP); Takeyasu Kobayashi, Kanagawa (JP); Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 179 days.

(21) Appl. No.: 18/542,567

(22) Filed: Dec. 15, 2023

(65) Prior Publication Data

US 2024/0215139 A1 Jun. 27, 2024

(30) Foreign Application Priority Data

Dec. 27, 2022 (JP) ................................ 2022-210693

(51) Int. Cl.
*H05G 1/04* (2006.01)
*H05G 1/30* (2006.01)

(52) U.S. Cl.
CPC ................ *H05G 1/04* (2013.01); *H05G 1/30* (2013.01)

(58) Field of Classification Search
None
See application file for complete search history.

(56) References Cited

U.S. PATENT DOCUMENTS

2005/0053199 A1* 3/2005 Miles ...................... H05G 1/10 378/197
2007/0116180 A1 5/2007 Omernick et al.
2019/0000411 A1 1/2019 Kim
2019/0380671 A1 12/2019 Sato et al.
2020/0229786 A1* 7/2020 Park ...................... G16H 30/20

FOREIGN PATENT DOCUMENTS

WO 2018/159011 A1 9/2018

OTHER PUBLICATIONS

The extended European search report issued by the European Patent Office on Feb. 12, 2024, which corresponds to European Patent Application No. 23218197.4-1126 and is related to U.S. Appl. No. 18/542,567.

* cited by examiner

*Primary Examiner* — Marcus H Taningco
(74) *Attorney, Agent, or Firm* — Studebaker Brackett PLLC

(57) ABSTRACT

A radiation irradiation device includes: a device main body that emits radiation; a display device that is provided in the device main body; a remote operation unit that is capable of remotely operating the device main body; a first wireless communication unit that wirelessly communicates first information including an operation instruction for operating the device main body by using a first wireless communication system, with the remote operation unit; and a second wireless communication unit that wirelessly communicates second information including information to be displayed on the display device by using a second wireless communication system, with an external device provided outside the device main body.

10 Claims, 10 Drawing Sheets

RADIATION IRRADIATION DEVICE

CROSS-REFERENCE TO RELATED APPLICATION

This application claims priority from Japanese Patent Application No. 2022-210693, filed Dec. 27, 2022, the disclosure of which is incorporated herein by reference in its entirety.

BACKGROUND

Technical Field

The present disclosure relates to a radiation irradiation device.

Related Art

WO2018/159011A discloses a radiation irradiation device comprising a radiation generation unit that generates radiation, and a switch unit that controls emission of the radiation from the radiation generation unit. The radiation generation unit and the switch unit are composed of separate housings, and the radiation generation unit and the switch unit are configured to be attachable and detachable via a partial surface of each housing.

As disclosed in WO2018/159011A, in some cases, an operation unit (switch unit in WO2018/159011A) for remotely operating a device main body is provided in a radiation irradiation device. The operation unit and the device main body can perform wireless communication, and an operation signal is wirelessly transmitted from the operation unit toward the device main body including the radiation generation unit.

In such a radiation irradiation device, there is a demand for a function of wirelessly communicating various types of data with an external device other than the operation unit, in addition to exchange of the operation signal with the operation unit. As the various types of data, for example, information (for example, an image, patient information, or the like) to be displayed on a display of the radiation irradiation device is assumed. The performance required for the wireless communication unit varies between the wireless communication of the information for display and the wireless communication of the operation signal. Therefore, in a case where the wireless communication is to be realized only by a single wireless communication system, there is a disadvantage in that communication cannot be performed smoothly.

SUMMARY

The technology of the present disclosure provides a radiation irradiation device that can smoothly perform communication with an outside as compared with a case of performing communication with the outside only by a single wireless communication system.

A first aspect according to the technology of the present disclosure is a radiation irradiation device comprising: a device main body that emits radiation; a display device that is provided in the device main body; a remote operation unit that is capable of remotely operating the device main body; a first wireless communication unit that wirelessly communicates first information including an operation instruction for operating the device main body by using a first wireless communication system, with the remote operation unit; and a second wireless communication unit that wirelessly communicates second information including information to be displayed on the display device by using a second wireless communication system, with an external device provided outside the device main body.

A second aspect according to the technology of the present disclosure is the radiation irradiation device according to the first aspect, in which the first wireless communication unit has a faster response speed than the second wireless communication unit.

A third aspect according to the technology of the present disclosure is the radiation irradiation device according to the first aspect, in which the first wireless communication unit has a smaller power consumption than the second wireless communication unit.

A fourth aspect according to the technology of the present disclosure is the radiation irradiation device according to the first aspect, in which the first wireless communication unit has a shorter reachable distance of radio waves used for wireless communication than the second wireless communication unit.

A fifth aspect according to the technology of the present disclosure is the radiation irradiation device according to the first aspect, in which the second wireless communication unit has a faster communication speed than the first wireless communication unit.

A sixth aspect according to the technology of the present disclosure is the radiation irradiation device according to the first aspect, in which the operation instruction includes an irradiation start instruction for causing the device main body to start irradiation with the radiation.

A seventh aspect according to the technology of the present disclosure is the radiation irradiation device according to the first aspect, in which the second information includes an optical image of a subject, a radiation image of the subject, and/or imaging information.

An eighth aspect according to the technology of the present disclosure is the radiation irradiation device according to the sixth aspect, further comprising a processor, in which the processor is configured to: derive a distance between the device main body and the remote operation unit based on a result of wireless communication between the first wireless communication unit and the remote operation unit; and execute irradiation control according to the distance in a case where the irradiation start instruction is received.

A ninth aspect according to the technology of the present disclosure is the radiation irradiation device according to the eighth aspect, in which the irradiation control includes prohibiting the irradiation with the radiation or issuing a warning as to whether the irradiation with the radiation is allowed in a case where the distance is equal to or less than a predetermined value.

A tenth aspect according to the technology of the present disclosure is the radiation irradiation device according to the eighth aspect, in which the irradiation control includes permitting the irradiation with the radiation in a case where the distance is equal to or more than a predetermined value.

The technology of the present disclosure provides a radiation irradiation device that can smoothly perform communication with an outside as compared with a case of performing communication with the outside only by a single wireless communication system.

DETAILED DESCRIPTION

Hereinafter, an embodiment of the present disclosure will be described in detail with reference to the drawings.

In the following description, for convenience of explanation, a height direction, a width direction, and a front-rear direction (also referred to as a depth direction) of a radiation irradiation device 10 are indicated by three arrows X, Y, and Z. First, the height direction is indicated by the arrow Z, an arrow Z direction pointed by the arrow Z is an upward direction of the radiation irradiation device 10, and an opposite direction of the upward direction is a downward direction. The height direction is a vertical direction. The width direction is indicated by the arrow X orthogonal to the arrow Z, a direction pointed by the arrow X is a right direction of the radiation irradiation device 10, and an opposite direction of the right direction is a left direction. The front-rear direction is indicated by the arrow Y orthogonal to the arrow Z and the arrow X, a direction pointed by the arrow Y is a front direction of the radiation irradiation device 10, and an opposite direction of the front direction is a rear direction. That is, in the radiation irradiation device 10, an emission direction of the radiation is the front direction, and a side on which a subject A stands (see FIG. 1) is the front direction. In addition, in the following, expressions using sides such as an upper side, a lower side, a left side, a right side, a front side, and a rear side have the same meanings as the expressions using the directions.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

Figure 1:
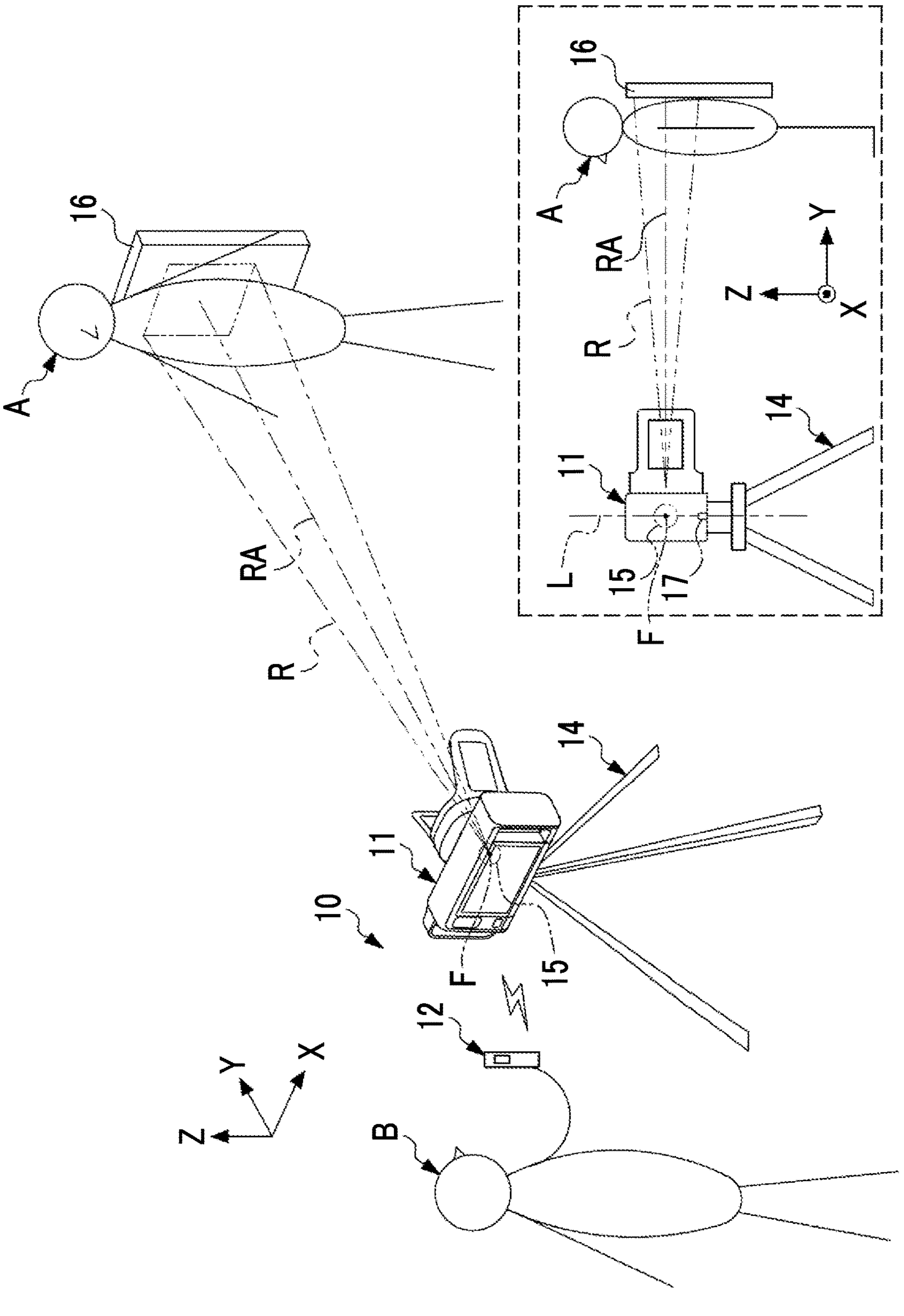
FIG. 1 is a perspective view showing an example of a usage state of a radiation irradiation device.

As shown in FIG. 1 as an example, the radiation irradiation device 10 comprises a device main body 11 and a remote operation unit 12. The device main body 11 is a device that can irradiate the subject A with radiation R. The device main body 11 comprises a radiation tube 15, which is a generation source of the radiation, inside thereof and emits the radiation (for example, X-rays or γ-rays) generated in the radiation tube 15 toward the subject A via an irradiation field limiter (see FIG. 3), an irradiation window (see FIG. 3), and the like. The radiation irradiation device 10 is an example of a "radiation irradiation device" according to the technology of the present disclosure, the device main body 11 is an example of a "device main body" according to the technology of the present disclosure, and the remote operation unit 12 is an example of a "remote operation unit" according to the technology of the present disclosure. Here, the term "remote" means separation to the extent caused by physical separation, and does not mean an amount of distance.

The radiation irradiation device 10 has a portable size and weight. That is, the radiation irradiation device 10 is a portable radiation irradiation device. The radiation irradiation device 10 may be used, for example, in a simple radiographic examination at a medical facility or may be used in a radiographic examination during home medical care. In addition, the radiation irradiation device 10 may be used outdoors. For example, the radiation irradiation device 10 may be used for an on-site medical care in a disaster-stricken area or a medically underserved area.

The device main body 11 is set at a predetermined position (height and distance) with respect to the subject A via, for example, a tripod 14. A fixing portion 17 for fixing the tripod 14 and the device main body 11 is provided on a lower surface of the device main body 11. The fixing portion 17 is, for example, a screw hole. The fixing portion 17 is located on a straight line L which is orthogonal to a central axis RA of a flux of the radiation R and passes through a focus F of the radiation tube 15. The radiation tube 15 generates the radiation R, for example, by colliding electrons emitted from a cathode with a target. The focus F is a position where the electrons collide on the target. The flux of the radiation R spreads in a conical shape with the focus F as a base point. The central axis RA is a central axis of such a flux. The fixing portion 17 is provided at a position where the straight line L and the lower surface of the device main body 11 intersect. In the radiation irradiation device 10, a portion in which the focus F of the radiation tube 15 is located is close to a centroid. The fixing portion 17 is provided on the straight line L, which makes it easy to stabilize the radiation irradiation device 10 on the tripod 14.

The remote operation unit 12 is a device that can remotely operate the device main body 11. The remote operation unit 12 is attachable to and detachable from the device main body 11. The remote operation unit 12 remotely operates the device main body 11, for example, by performing wireless communication with the device main body 11. The remote operation by the remote operation unit 12 includes, for example, an operation of causing the device main body 11 to emit the radiation R toward the subject A.

A user B, who is an operator of the radiation irradiation device 10, takes out the remote operation unit 12 from the device main body 11 and then operates the remote operation unit 12 in a state of being separated from the device main body 11 by a predetermined distance. As a result, the radiation R is emitted from the radiation tube 15 of the device main body 11 to the subject A. The radiation R transmitted through the subject A is detected by a detector 16. The detector 16 is, for example, a so-called flat panel detector, has a detection surface on which pixels are two-dimensionally arranged, and outputs an image signal corresponding to an intensity of the radiation R incident on each pixel. The radiation R is transmitted through the subject A to carry information regarding a body tissue of the subject A. The detector 16 detects the radiation R in each pixel of the detection surface to output an image signal representing a projection image of the body tissue of the subject A as a radiation image.

Further, the user B accommodates the remote operation unit 12 in the device main body 11 after completing imaging using the radiation irradiation device 10. In a state in which the remote operation unit 12 is accommodated in the device main body 11, the radiation irradiation device 10 is carried by the user B or is stored in a storage case of the radiation irradiation device 10.

Figure 2:
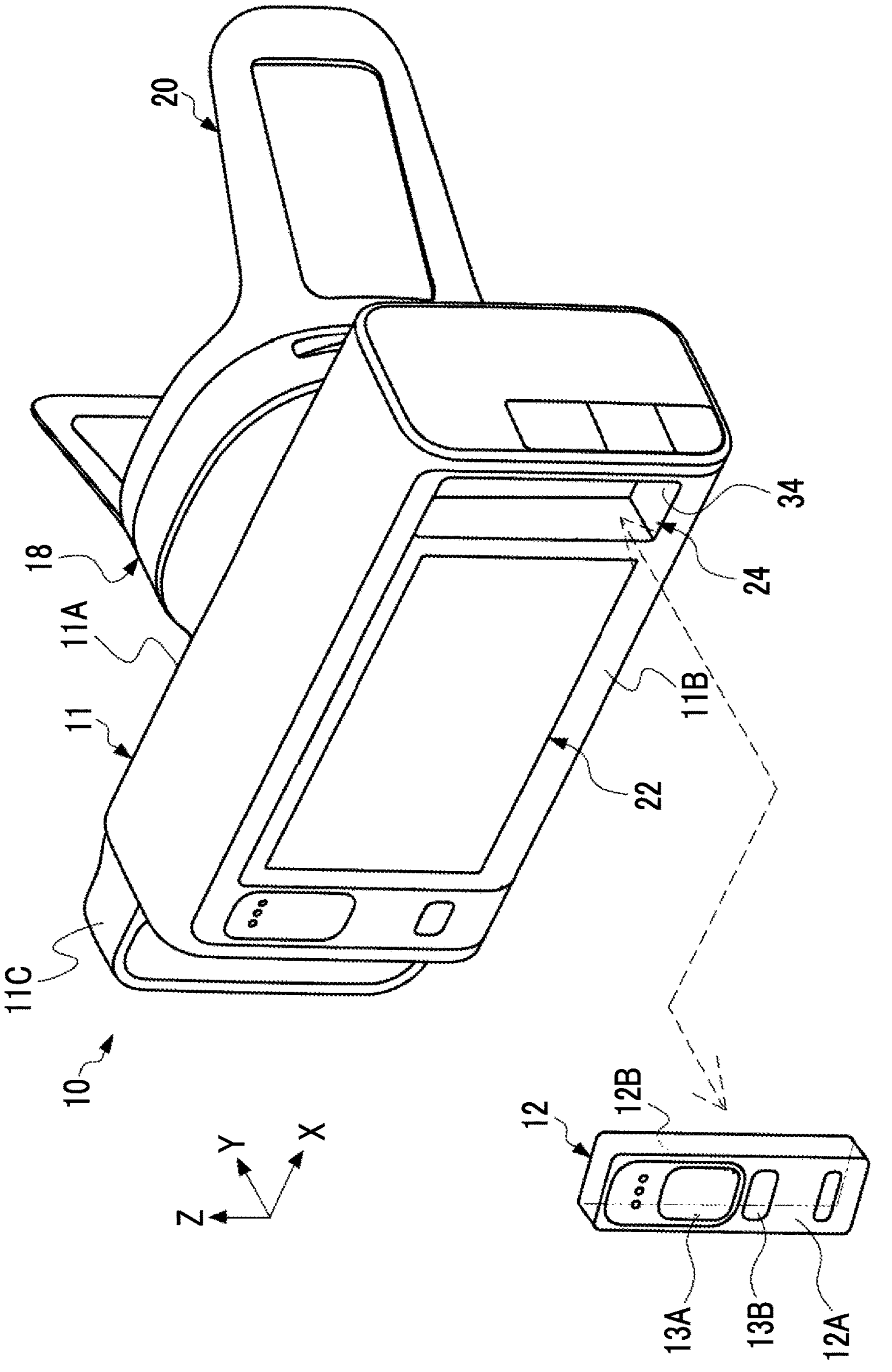
FIG. 2 is an external perspective view showing an example of a configuration of the radiation irradiation device.

As shown in FIG. 2 as an example, the device main body 11 has a substantially rectangular parallelepiped shape having a longitudinal direction in a left-right direction. A tubular portion 18 that protrudes toward an emission direction of the radiation R is provided on a front surface 11A of the device main body 11. The irradiation field limiter (also called a collimator) and the irradiation window, which will be described later, are attached inside the tubular portion 18. Further, a skin guard 20 is attached to a distal end of the tubular portion 18. The skin guard 20 is used to ensure a necessary space between the device main body 11 and the subject A, and prevents the subject A from being irradiated with the radiation R in a state in which the device main body 11 is too close to the subject A.

An accommodation portion 24 is provided on a rear surface 11B of the device main body 11. The accommodation portion 24 accommodates the remote operation unit 12 in a form in which the remote operation unit 12 is embedded in the rear surface 11B of the device main body 11. Specifically, the accommodation portion 24 has a recessed inner wall surface 34. In a state in which the remote operation unit 12 is accommodated in the accommodation portion 24, the inner wall surface 34 faces all surfaces of the remote operation unit 12 except for a back surface 12B. As described above, the accommodation portion 24 accommodates the remote operation unit 12.

A display 22 is provided on the rear surface 11B of the device main body 11. The display 22 displays various types of information related to the radiography. The display 22 may be, for example, a liquid crystal display or may be an electro-luminescence (EL) display. The display 22 is an example of a "display device" according to the technology of the present disclosure. Further, a grip member 11C is attached to a left side surface of the device main body 11. The user B grips the radiation irradiation device 10 via the grip member 11C.

The remote operation unit 12 has a substantially rectangular parallelepiped shape having a longitudinal direction in an up-down direction in a state of being accommodated in the device main body 11. The remote operation unit 12 has an operation surface 12A and the back surface 12B. An irradiation button 13A and an imaging button 13B are provided on the operation surface 12A.

The irradiation button 13A is an operation button for giving an instruction for the irradiation with the radiation R. In a case where the irradiation button 13A is pressed by the user B, a signal for irradiating with the radiation R is output from the remote operation unit 12 to the device main body 11. In addition, an optical camera (not shown) is built into the radiation irradiation device 10. The imaging button 13B is an operation button for giving an instruction for imaging by the optical camera. In a case where the imaging button 13B is pressed by the user B, a signal for causing an optical camera, which will be described later, to perform imaging is output from the remote operation unit 12 to the device main body 11. The back surface 12B is a surface opposite to the operation surface 12A, and operation keys including the irradiation button 13A and the imaging button 13B are not provided on the back surface 12B.

Here, an example in which the irradiation button 13A and the imaging button 13B are buttons has been described, but this is merely an example. The irradiation button 13A and the imaging button 13B may be cursors, slide switches, or touch pads.

Figure 3:
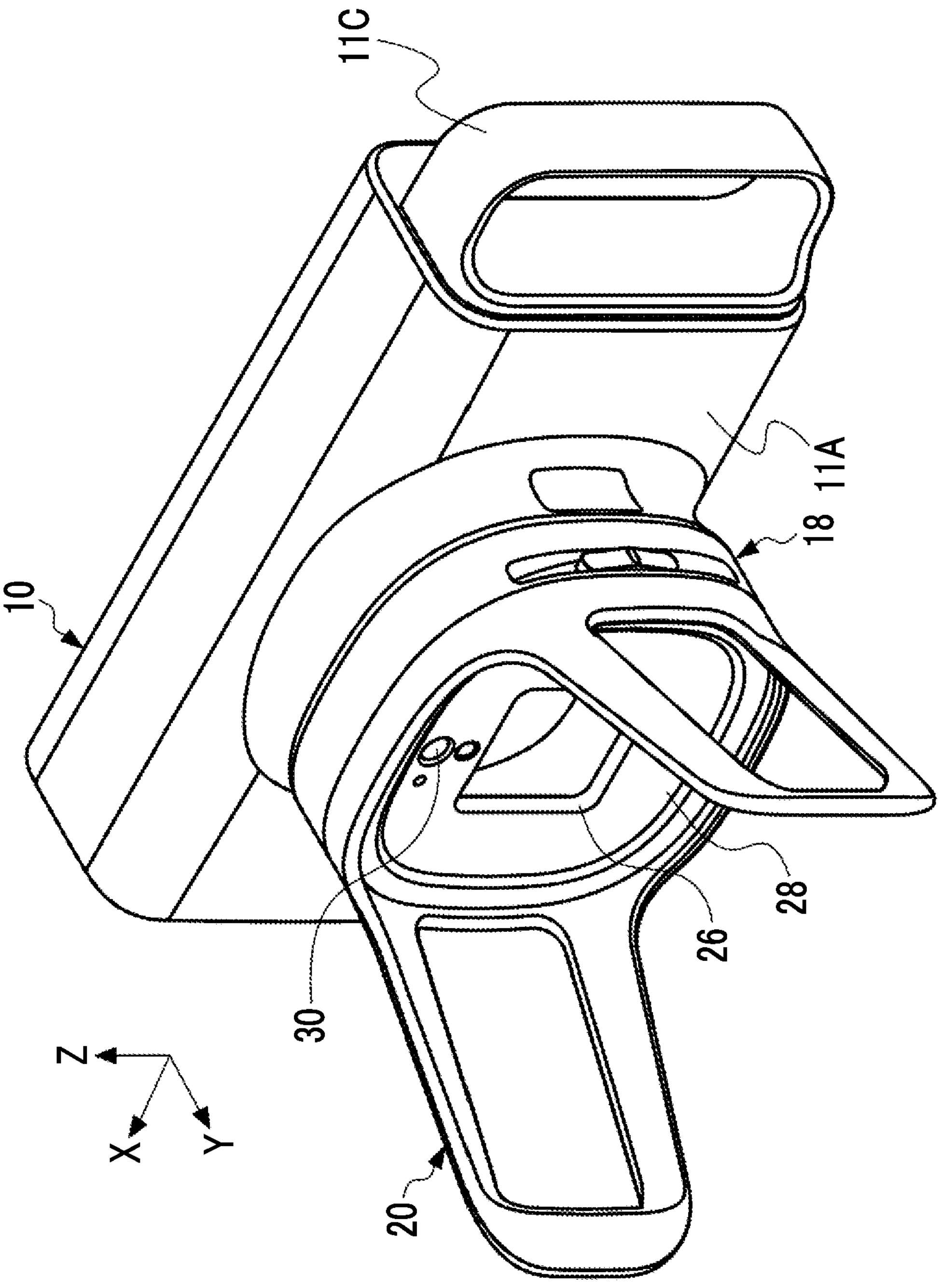
FIG. 3 is an external perspective view showing an example of the configuration of the radiation irradiation device.

As shown in FIG. 3 as an example, the tubular portion 18 protruding from the front surface 11A of the device main body 11 has an irradiation field limiter 26 and an irradiation window 28. The irradiation field limiter 26 is an irradiation field limiter that defines an irradiation range of the radiation R to a predetermined range. In addition, the irradiation window 28 is a window member that is made of a member transparent to the radiation R and partitions an outside and an inside of the tubular portion 18. The radiation R emitted from the radiation tube 15 has an irradiation range defined by the irradiation field limiter 26 and is emitted from the irradiation window toward the subject A. Further, an optical camera 47 (see FIG. 4) is provided in the tubular portion 18. The optical camera 47 is, for example, an imaging device having an image sensor such as a charge coupled device (CCD) image sensor and a complementary metal-oxide-semiconductor (CMOS) image sensor. Reference 30 denotes an imaging window that is a part of a lens of the optical camera. Image light of the subject A is incident on the image sensor in the optical camera through the imaging window 30. The optical camera images, for example, the subject A. An optical image of the imaged subject A is used, for example, to perform registration of an irradiation position of the radiation R.

Figure 4:
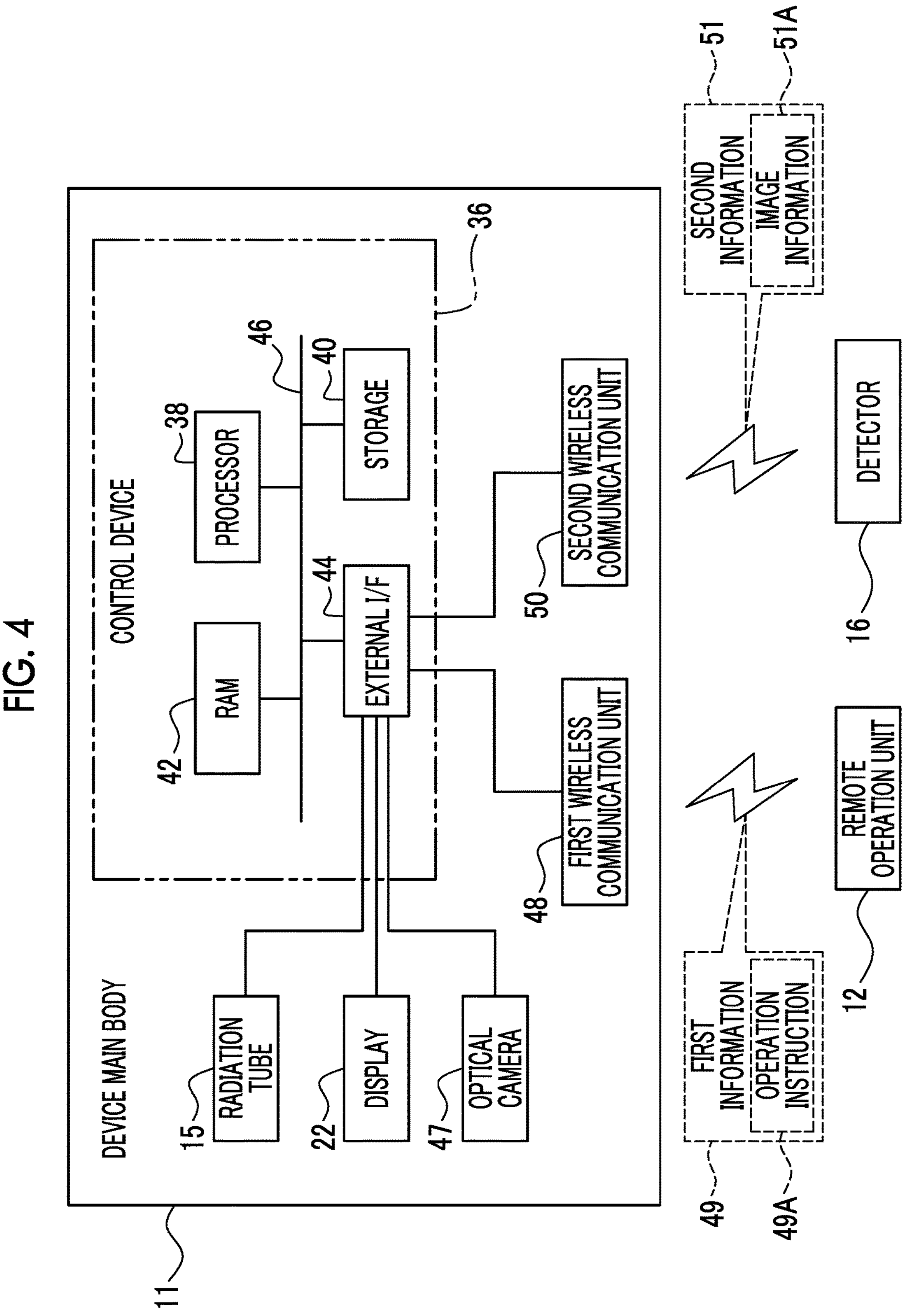
FIG. 4 is a block diagram showing an example of a hardware configuration of an electric system of the radiation irradiation device.

As shown in FIG. 4 as an example, the device main body 11 comprises a control device 36. The control device 36 controls an overall operation of the device main body 11. The control device 36 comprises a processor 38, a storage 40, a random access memory (RAM) 42, and an external interface (I/F) 44. The processor 38, the storage 40, the RAM 42, and the external I/F 44 are connected to a bus 46. The processor 38 is an example of a "processor" according to the technology of the present disclosure.

A memory is connected to the processor 38. The memory includes the storage 40 and the RAM 42. The processor 38 is, for example, a central processing unit (CPU). The processor 38 may be provided with a graphics processing unit (GPU) dedicated to image processing, separately from the CPU.

The storage 40 is a non-volatile storage device that stores various programs, various parameters, and the like. Examples of the storage 40 include a flash memory (for example, an electrically erasable and programmable read only memory (EEPROM) and a solid state drive (SSD)), and/or a hard disk drive (HDD). The flash memory and the HDD are merely an example, and at least one of the flash memory, the HDD, a magnetoresistive memory, or a ferroelectric memory may be used as the storage 40.

The RAM 42 is a memory in which the information is transitorily stored, and is used as a work memory by the processor 38. Examples of the RAM 42 include a dynamic random access memory (DRAM) and a static random access memory (SRAM).

The external I/F 44 is responsible for exchanging various types of information with devices present outside the control device 36. The external I/F 44 is communicably connected to the radiation tube 15, the display 22, and the optical camera 47. In addition, the external I/F 44 is connected to a first wireless communication unit 48 and a second wireless communication unit 50, which are described below.

The device main body 11 comprises the first wireless communication unit 48 and the second wireless communication unit 50. The first wireless communication unit 48 wirelessly communicates first information 49 with the remote operation unit 12. The first information 49 includes an operation instruction 49A for remotely operating the device main body 11. The operation instruction 49A includes an irradiation start instruction to cause the device main body 11 to start the irradiation with the radiation. As another example, the operation instruction 49A includes an instruction to start imaging by the optical camera 47 and/or an instruction to turn off the device main body 11. The first wireless communication unit 48 is hardware that is used to perform wireless communication with the remote operation unit 12 and is a wireless communication interface (I/F). The wireless communication I/F as the first wireless communication unit 48 includes, for example, a communication antenna and a transmission/reception circuit. The first wireless communication unit 48 is an example of a "first wireless communication unit" according to the technology of the present disclosure, the first information 49 is an example of "first information" according to the technology of the present disclosure, and the operation instruction 49A is an example of an "operation instruction" according to the technology of the present disclosure.

The second wireless communication unit 50 wirelessly communicates second information 51 with the detector 16. Here, the detector 16 is an example of an "external device" according to the technology of the present disclosure. The second information 51 includes information to be displayed on the display 22. The second information 51 includes information (hereinafter, also simply referred to as image information 51A) indicating a radiation image (see FIG. 6) to be displayed on the display 22. The second wireless communication unit 50 is hardware that is used to perform wireless communication with the detector 16, that is, a wireless communication interface (I/F). The wireless communication I/F as the second wireless communication unit 50 includes, for example, a communication antenna and a transmission/reception circuit. The second wireless communication unit 50 is an example of a "second wireless communication unit" according to the technology of the present disclosure, and the second information 51 is an example of "second information" according to the technology of the present disclosure.

The first wireless communication unit 48 and the second wireless communication unit 50 may be configured as separate units, but the first wireless communication unit 48 and the second wireless communication unit 50 may be physically integrated, for example, by being formed on the same substrate.

In the wireless communication between the first wireless communication unit 48 and the remote operation unit 12, the first information 49 is exchanged. The first information 49 includes the operation instruction 49A for remotely operating the device main body 11. For the remote operation, it is required that a deviation between an operation timing requested by a user and an actual operation timing of the device main body 11 is small. Therefore, in the wireless communication between the first wireless communication unit 48 and the remote operation unit 12, it is required that a response speed is fast.

Figure 5:
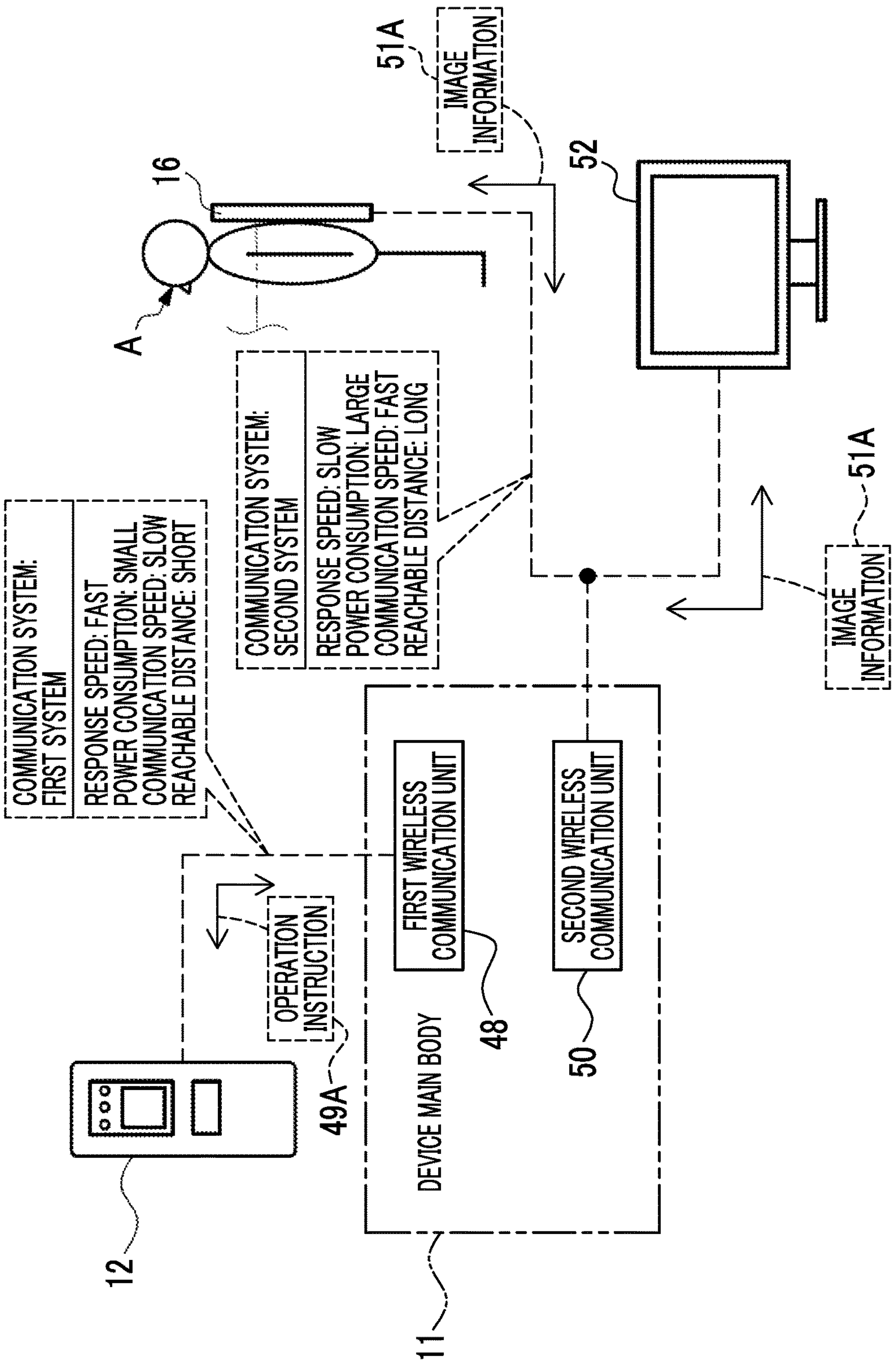
FIG. 5 is a conceptual diagram showing an example of an aspect of wireless communication by a first wireless communication unit and a second wireless communication unit.

Accordingly, the first wireless communication unit 48 has a faster response speed than the second wireless communication unit 50. As shown in FIG. 5 as an example, the first wireless communication unit 48 performs wireless communication using a first system as a wireless communication system. The first system is, for example, a wireless communication system based on specifications of Bluetooth (registered trademark). In addition, the second wireless communication unit 50 performs wireless communication using a second system as a wireless communication system. The first system is, for example, a wireless communication system based on Institute of Electrical and Electronic Engineers (IEEE) 802.11 standard, which is a wireless local area network (LAN) standard, and is also referred to as so-called Wi-Fi (registered trademark) or the like. The response speed of the first wireless communication unit 48 of the first system is faster than that of the second wireless communication unit 50 of the second system.

In the wireless communication between the first wireless communication unit 48 and the remote operation unit 12, it is required to avoid interference. This is because by avoiding the interference, inhibition of communication can be suppressed, and a decrease in the response speed can be suppressed. In order to avoid the interference, it is desirable to shorten a reachable distance of radio waves for avoiding interference of the radio waves with other communication devices. Accordingly, the first wireless communication unit 48 has a shorter reachable distance of the radio waves used for wireless communication than the second wireless communication unit 50. Specifically, a reachable distance of the radio waves by Bluetooth (registered trademark), which is an example of the first system of the first wireless communication unit 48, is small compared with the wireless LAN standard which is an example of the second system of the second wireless communication unit 50.

Further, the remote operation unit 12 is operated by a power supply different from a power supply of the device main body 11. For this reason, it is desirable that a power consumption required for wireless communication between the remote operation unit 12 and the device main body 11 is as small as possible. Thus, a power consumption of the first wireless communication unit 48 is smaller than that of the second wireless communication unit 50. Specifically, a power consumption for wireless communication by the first wireless communication unit 48 of the first system is smaller than a power consumption for wireless communication by the second wireless communication unit 50 of the second system.

The operation instruction 49A exchanged between the remote operation unit 12 and the first wireless communication unit 48 is information having a small data capacity compared with the image information 51A. Therefore, even a wireless communication system having a relatively slow communication speed and a small data capacity that can be transmitted and received such as the first system is sufficient for wireless communication between the remote operation unit 12 and the first wireless communication unit 48.

On the other hand, the image information 51A, which is exchanged between the detector 16 and the second wireless communication unit 50, is information having a large data capacity, compared with the operation instruction 49A. Thus, a communication speed of the second wireless communication unit 50 is faster than that of the first wireless communication unit 48. Specifically, the second wireless communication unit 50 employs a wireless communication system having a relatively fast communication speed and a large data capacity that can be transmitted and received such as the wireless LAN standard. The performance described above is required for each of the first system and the second system, and those having characteristics that conform to such requests are employed.

Further, the image information 51A may be exchanged between a personal computer 52 provided outside the radiation irradiation device 10 and the second wireless communication unit 50, instead of the detector 16 or together with the detector 16. Here, although an example in which the personal computer 52 is provided outside the radiation irradiation device 10 has been described, this is merely an example. At least one of a smart device, a server, or a printer may be provided instead of the personal computer 52 or together with the personal computer 52.

Figure 6:
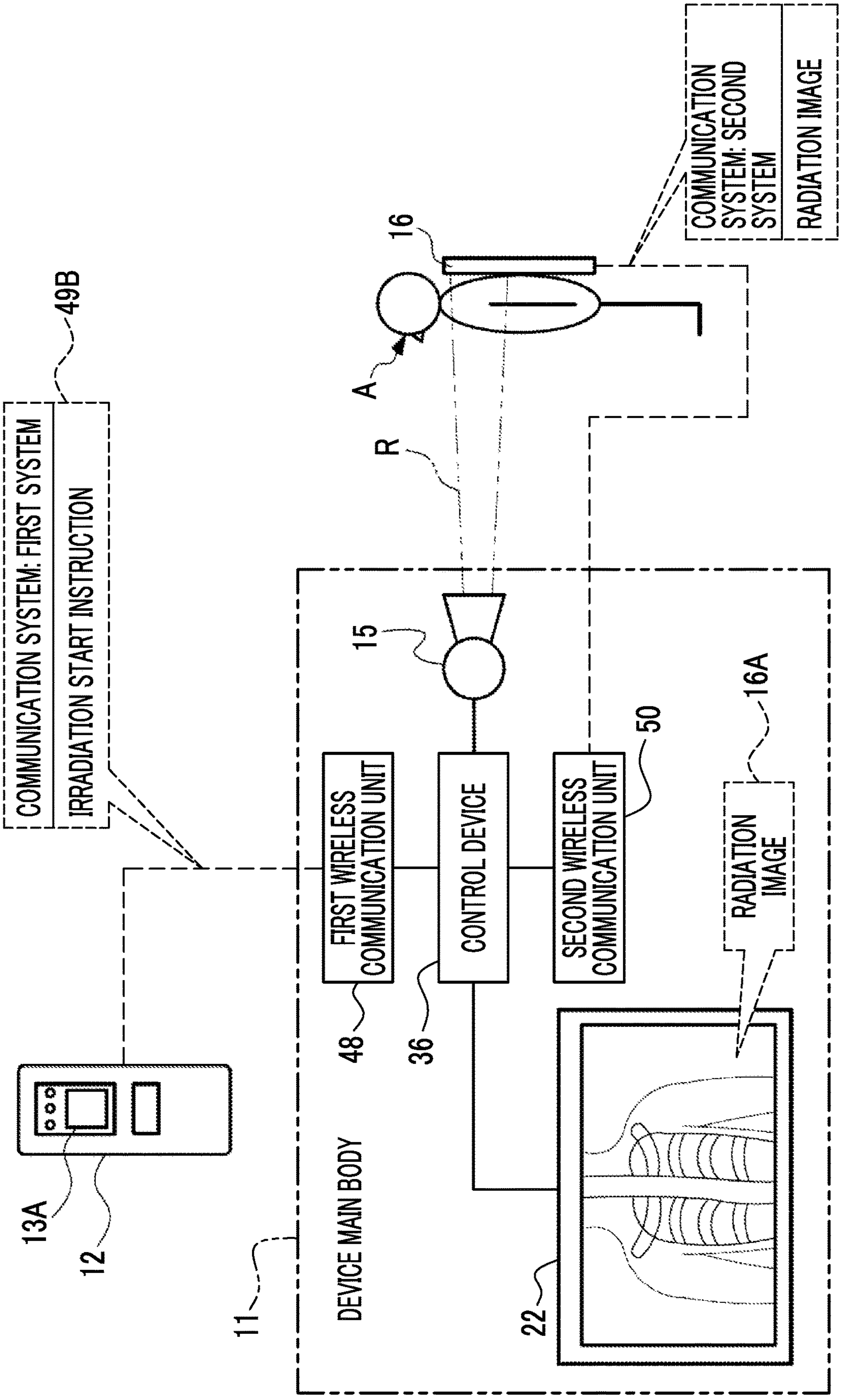
FIG. 6 is a conceptual diagram showing an example of an aspect of wireless communication by a first wireless communication unit and a second wireless communication unit.

As shown in FIG. 6 as an example, in a case where the user (see FIG. 1) presses the irradiation button 13A of the remote operation unit 12, an irradiation start instruction 49B, which is an instruction to start the irradiation with the radiation R, is transmitted from the remote operation unit 12 to the device main body 11. The irradiation start instruction 49B is an example of an "irradiation start instruction" according to the technology of the present disclosure. The wireless communication with the remote operation unit 12 is performed by the first wireless communication unit 48 which employs the first system as a wireless communication system. The first wireless communication unit 48 receives the irradiation start instruction 49B. The control device 36 starts the control of the radiation tube 15 based on the irradiation start instruction 49B received via the first wireless communication unit 48. For example, the control device 36 controls the radiation tube 15 such that the radiation R is emitted with a predetermined tube voltage, tube current, and irradiation time. The radiation tube 15 is operated under the control of the control device 36. As a result, the radiation R is emitted from the radiation tube 15 toward the subject A.

The detector 16 detects the radiation R. A detection result of the radiation R is transmitted from the detector 16 as a radiation image 16A. In addition, the radiation image 16A is an example of a "radiation image" according to the technology of the present disclosure. The wireless communication with the detector 16 is performed by using the second wireless communication unit 50 which employs the second system as a wireless communication system. The second wireless communication unit 50 receives the radiation image 16A. The control device 36 displays the radiation image 16A acquired via the second wireless communication unit 50 on the display 22. Specifically, the control device 36 performs graphical user interface (GUI) control for displaying the radiation image 16A to display a screen including the radiation image 16A on the display 22. The user can check a result of the radiography by viewing the radiation image 16A displayed on the display 22.

As described above, in the radiation irradiation device 10 according to the present embodiment, the first information 49 including the operation instruction 49A for operating the device main body 11 and the second information 51 including the image information 51A to be displayed on the display 22 of the device main body 11 are different in the purpose of use of the information and the data capacity. Therefore, it is possible to perform wireless communication according to the purpose of use of information and the data capacity by communicating with the outside using a wireless communication system according to each piece of the information. Accordingly, wireless communication between the device main body 11 and the outside is smoothly performed as compared with a case where communication with the outside is performed only by a single wireless communication system.

For example, as the operation instruction 49A, the first system having a small data capacity but having good responsiveness is suitable in order to reduce an operation delay. On the other hand, since the image information 51A has a large data capacity, the second system having a high communication speed is suitable. Thus, in a case where an attempt is made to transmit the image information 51A by using the first system suitable for the operation instruction 49A, it takes a significant amount of time for transmission, and smooth wireless communication is difficult. On the contrary, in a case where only the second system suitable for the image information 51A is used, responsiveness in the transmission of the operation instruction 49A is poor, and an operation delay occurs. In the present configuration, communication with the outside is performed using the first system suitable for the first information 49 and the second system suitable for the second information 51. Therefore, wireless communication according to the purpose of use of information and the data capacity can be performed. As a result, the wireless communication between the device main body 11 and the outside is smoothly performed.

In addition, for example, in a case where an attempt is made to wirelessly communicate the first information 49 and the second information 51 using only a single wireless communication unit, interference may occur because a wireless communication system is common. As a result, the wireless communication between the device main body 11 and the outside is hindered. In the present configuration, since the first information 49 and the second information 51 are communicated using different wireless communication systems, interference between the first information 49 and the second information 51 is suppressed. As a result, the wireless communication between the device main body 11 and the outside is smoothly performed.

Further, in the radiation irradiation device 10 according to the present embodiment, the first wireless communication unit 48 has a faster response speed than the second wireless communication unit 50. The first wireless communication unit 48 performs wireless communication with the remote operation unit 12. In the wireless communication with the remote operation unit 12, it is desired that a delay of the operation on the device main body 11 is small. In the present configuration, the first wireless communication unit 48 has a faster response speed than the second wireless communication unit 50, so that the operation delay is suppressed.

Further, in the radiation irradiation device 10 according to the present embodiment, the first wireless communication unit 48 has a smaller power consumption than the second wireless communication unit 50. The remote operation unit 12 is operated by a power supply different from that of the device main body 11. By reducing the power consumption required for wireless communication between the first wireless communication unit 48 and the remote operation unit 12, the remote operation unit 12 can be charged less frequently and can be used for a long time. Thus, the convenience of the radiation irradiation device 10 is improved.

In addition, in the radiation irradiation device 10 according to the present embodiment, the first wireless communication unit 48 has a shorter reachable distance of the radio waves used for the wireless communication than the second wireless communication unit 50. Since the first wireless communication unit 48 has a shorter reachable distance of the radio waves than the second wireless communication unit 50, interference with other communication devices is suppressed. Accordingly, inhibition of wireless communication by interference, and a decrease in the response speed of wireless communication between the first wireless communication unit 48 and the remote operation unit 12 are suppressed.

In addition, the fact that the first wireless communication unit 48 has a shorter reachable distance of the radio waves used for wireless communication than the second wireless communication unit 50 means that the reachable distance for the second wireless communication unit 50 is longer than the reachable distance for the first wireless communication unit 48. For this reason, it is realized that wireless communication is performed even in a case where a distance between the device main body 11 and a device provided outside the radiation irradiation device 10 is long. Thus, a positional relationship between a device provided outside and the radiation irradiation device 10 is less likely to be limited, and the convenience of the radiation irradiation device 10 is improved.

In addition, in the radiation irradiation device 10 according to the present embodiment, the second wireless communication unit 50 has a faster communication speed than the first wireless communication unit 48. That is, a transmission data volume per unit time is large. The second wireless communication unit 50 performs wireless communication with a device provided outside the radiation irradiation device 10. The second information 51 including the image information 51A is exchanged between the second wireless communication unit 50 and the device provided outside. The second information 51 has a large data capacity as compared with the first information 49 including the operation instruction 49A. Therefore, it is realized that the communication of the second information 51 having a large data capacity is stably performed by performing wireless communication in the second wireless communication unit 50 having a faster communication speed than the first wireless communication unit 48.

Further, in the radiation irradiation device 10 according to the present embodiment, the operation instruction 49A includes the irradiation start instruction 49B for causing the device main body 11 to start the irradiation with the radiation. The operation instruction 49A exchanged by wireless communication with the remote operation unit 12 includes the irradiation start instruction 49B. Since the irradiation start instruction 49B is transmitted by a wireless communication system different from that of the image information 51A, it is possible to prevent an irradiation timing of the radiation from being missed.

Further, in the radiation irradiation device 10 according to the present embodiment, the second information 51 includes the radiation image 16A of the subject A. The information indicating the radiation image 16A has a larger data capacity than the operation instruction 49A. Therefore, it is realized that the communication is stably performed by performing wireless communication of the radiation image 16A in a system different from that of the operation instruction 49A.

Further, in the radiation irradiation device 10 according to the present embodiment, wireless communication units of different wireless communication systems are used between the wireless communication with the remote operation unit 12 and the wireless communication with the external device. This makes it less susceptible to the influence of other communication, and the operation instruction 49A is accurately delivered to the device main body 11. Further, since the first system such as Bluetooth (registered trademark) employed by the first wireless communication unit 48 has a faster response speed than the second system such as the wireless LAN standard, a delay in a remote operation is less likely to occur, and further, it is also possible to suppress a power consumption in the remote operation unit 12.

In addition, in the radiation irradiation device 10 according to the present embodiment, in the wireless communication with a device provided outside the radiation irradiation device 10, the second system, such as the wireless LAN standard, is used as a wireless communication system. Therefore, large-capacity communication can be performed at high speed, and it is realized that information having a large data capacity, such as the radiation image 16A, is smoothly exchanged between the device main body 11 and a device provided outside.

First Modification Example

In the above embodiment, although an example of a form in which the radiation image 16A is exchanged as the second information 51 between the detector 16 and the second wireless communication unit 50 has been described, the technology of the present disclosure is not limited thereto. In the first modification example, an optical image 47A and imaging information 15A are exchanged as the second information 51 between the device main body 11 and the device provided outside. The optical image 47A is an example of an "optical image" according to the technology of the present disclosure, and the imaging information 15A is an example of "imaging information" according to the technology of the present disclosure.

Figure 7:
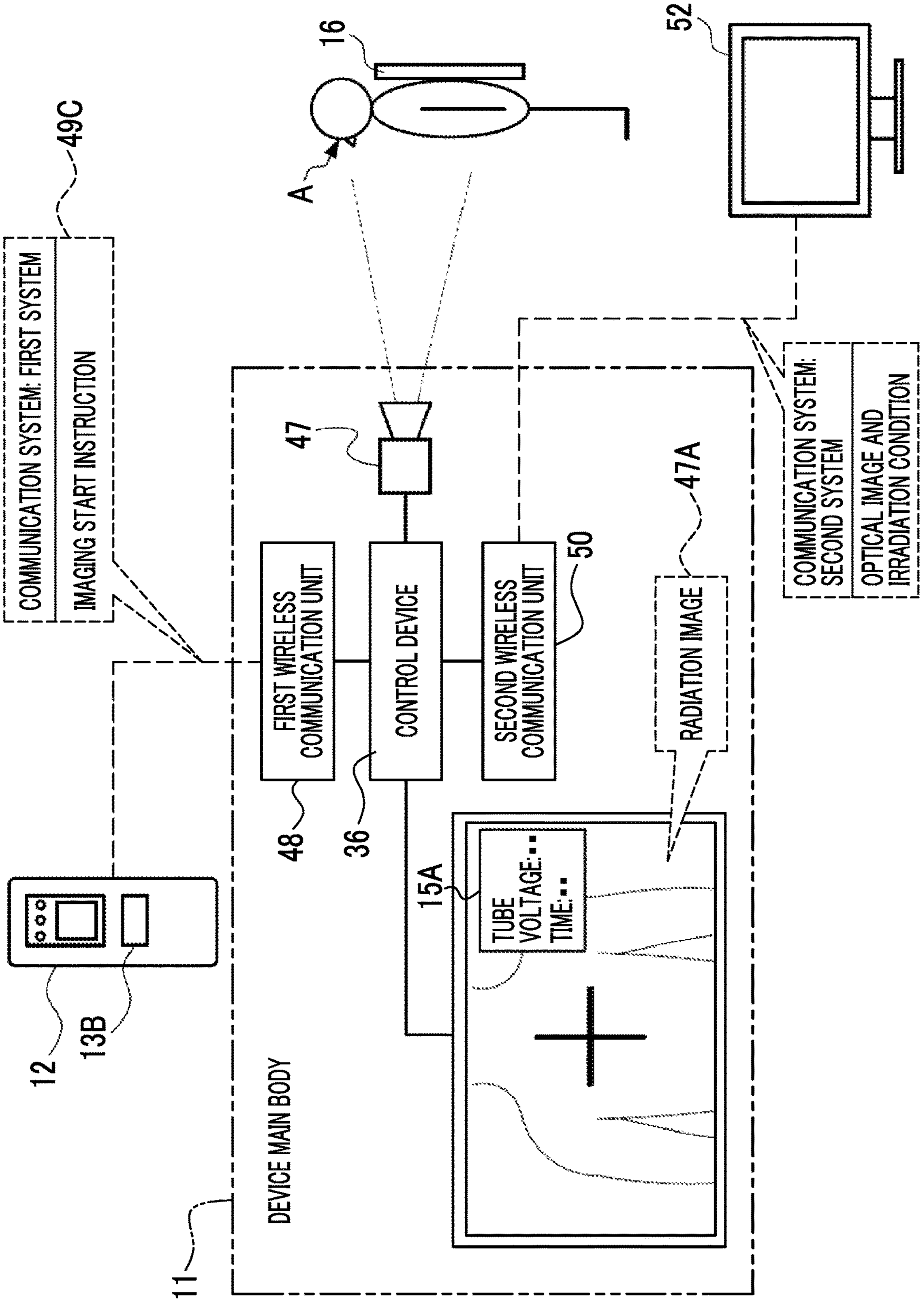
FIG. 7 is a conceptual diagram showing an example of an aspect of wireless communication by the first wireless communication unit and the second wireless communication unit.

As shown in FIG. 7 as an example, in a case where the user (see FIG. 1) presses the imaging button 13B of the remote operation unit 12, an imaging start instruction 49C, which is an instruction to start imaging by the optical camera 47, is transmitted from the remote operation unit 12 to the device main body 11. The wireless communication with the remote operation unit 12 is performed by using the first wireless communication unit 48 of the first system. The first wireless communication unit 48 receives the imaging start instruction 49C. The control device 36 starts the control of the optical camera 47 based on the imaging start instruction 49C received via the first wireless communication unit 48. For example, the control device 36 controls the optical camera 47 such that imaging is performed under predetermined optical imaging conditions (for example, an imaging range). The optical camera 47 is operated under the control of the control device 36. As a result, imaging of the subject A by the optical camera 47 is performed. The control device 36 causes the display 22 to display the optical image 47A obtained by imaging performed by the optical camera 47.

The second wireless communication unit 50 acquires the imaging information 15A from the personal computer 52. The wireless communication with the personal computer 52 is performed by using the second wireless communication unit 50. The imaging information 15A is information that can be used for the radiography.

The imaging information 15A includes subject information and/or irradiation conditions. The subject information is information that can specify a subject of the radiography (for example, a name, an age, or a gender of the subject). The irradiation conditions are conditions for irradiation with the radiation. The irradiation conditions include, for example, a tube voltage, a tube current, and an irradiation time of the radiation tube 15.

The control device 36 acquires the imaging information 15A via the second wireless communication unit 50. Then, the control device 36 causes the display 22 to display an image indicating the imaging information 15A. In the example shown in FIG. 7, an example in which the irradiation conditions of the tube voltage and the irradiation time are displayed as the imaging information 15A is shown. The user can check information that can be used in the radiography, by viewing the optical image 47A and the imaging information 15A that are displayed on the display 22.

Further, the control device 36 transmits the optical image 47A to the personal computer 52 via the second wireless communication unit 50. In the personal computer 52, the optical image 47A is displayed on a display or is stored in a storage.

As described above, in the radiation irradiation device 10 according to the first modification example, the second information 51 includes the optical image 47A of the subject A and the imaging information 15A, and the information indicating the optical image 47A and the imaging information 15A has a larger data capacity than the operation instruction 49A. Therefore, it is realized that the communication is stably performed by performing wireless communication of the optical image 47A and the imaging information 15A in a system different from that of the operation instruction 49A.

In the first modification example, although an example of a form in which the second information 51 includes the optical image 47A and the imaging information 15A has been described, the technology of the present disclosure is not limited thereto. The second information 51 may include any one of the optical image 47A or the imaging information 15A. Further, the second information 51 may include the radiation image 16A together with the optical image 47A and the imaging information 15A.

Second Modification Example

In the second modification example, a distance between the remote operation unit 12 and the device main body 11 (hereinafter, also simply referred to as a "communication distance") is derived based on a result of wireless communication between the remote operation unit 12 and the first wireless communication unit 48. Then, the irradiation control of the radiation R is executed according to the derived distance.

Figure 8:
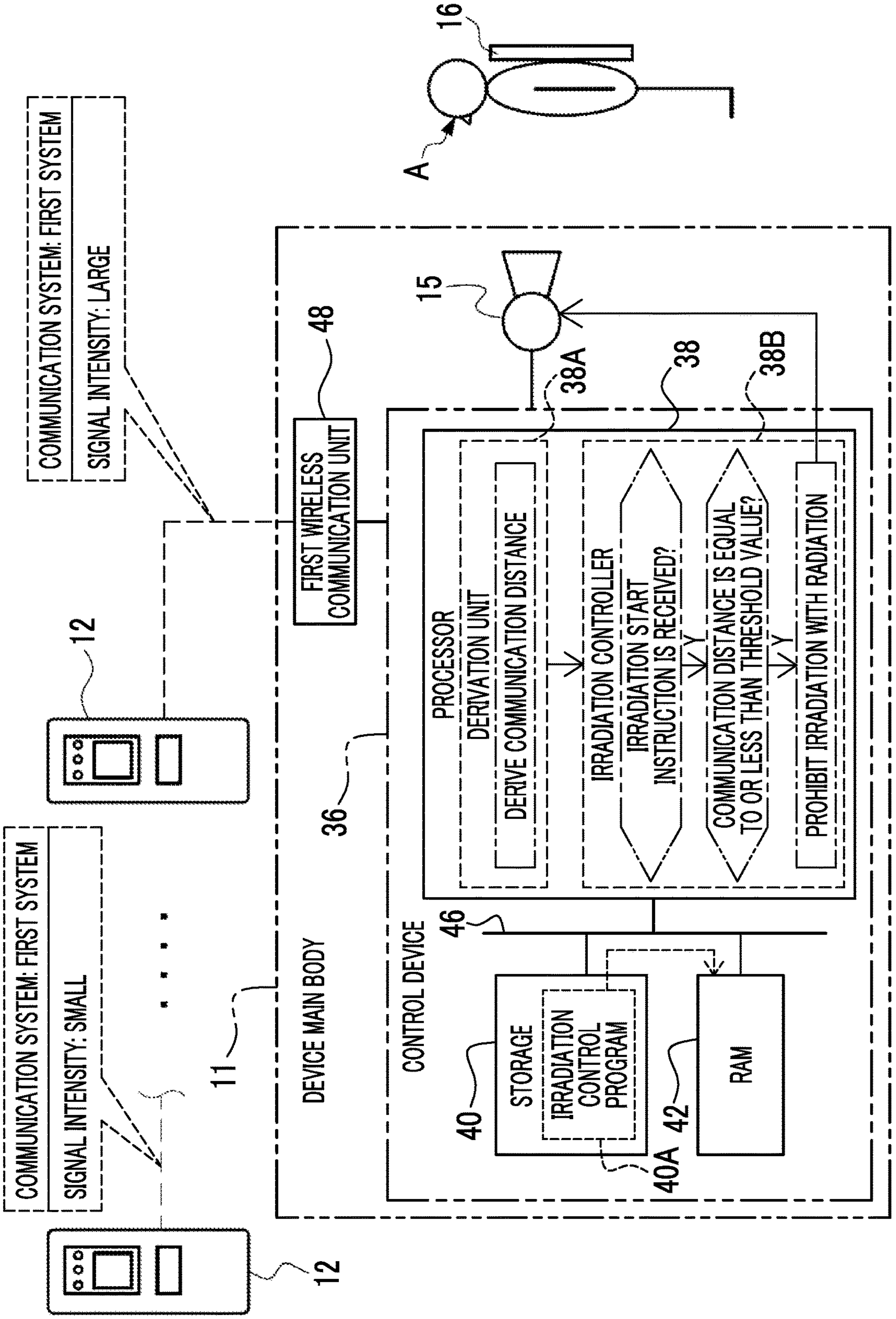
FIG. 8 is a conceptual diagram showing an example of contents of processing of a derivation unit and an irradiation controller.

As shown in FIG. 8 as an example, in the control device 36, the processor 38 reads out an irradiation control program 40A from the storage 40, and executes the read-out irradiation control program 40A on the RAM 42. Accordingly, the processor 38 operates as a derivation unit 38A and an irradiation controller 38B.

The derivation unit 38A derives the communication distance based on the result of wireless communication between the remote operation unit 12 and the first wireless communication unit 48. Here, a signal intensity in wireless communication varies depending on the communication distance. That is, the signal intensity is relatively large in a case where the remote operation unit 12 and the device main body 11 are close to each other, and the signal intensity is relatively small in a case where the remote operation unit 12 and the device main body 11 are spaced apart from each other.

Accordingly, in a case where an operation instruction such as the irradiation start instruction from the remote operation unit 12 is received, the first wireless communication unit 48 outputs the received signal intensity to the derivation unit 38A. The derivation unit 38A derives a communication distance based on the signal intensity. For example, the derivation unit 38A derives the communication distance by using a distance derivation table (not shown). The distance derivation table is a table in which the signal intensity is used as an input value and the communication distance is used as an output value. The derivation unit 38A uses the distance derivation table to derive the communication distance according to the signal intensity and outputs the communication distance to the irradiation controller 38B.

Here, although an example in which the communication distance is derived using the distance derivation table has been described, this is merely an example, and a distance calculation expression may be used. The distance calculation expression is a calculation expression in which the signal intensity is used as an independent variable and the communication distance is used as a dependent variable.

The irradiation controller 38B executes irradiation control according to the communication distance in a case where the irradiation start instruction is received. First, the irradiation controller 38B determines whether or not the irradiation start instruction has been received from the remote operation unit 12 via the first wireless communication unit 48. In a case where the determination is affirmative, the irradiation controller 38B subsequently determines whether or not the communication distance acquired from the derivation unit 38A is equal to or less than a threshold value (for example, 5 m). In a case where the determination is affirmative, the irradiation controller 38B performs, as the irradiation control, control of prohibiting the irradiation with the radiation. Specifically, even in a case where the irradiation start instruction is received, the irradiation controller 38B stops supplying power, which is used for irradiation with the radiation, to the radiation tube 15. Accordingly, in a case where the remote operation unit 12 is within a predetermined range from the device main body 11, the irradiation with the radiation R is not performed.

As described above, in the radiation irradiation device 10 according to the second modification example, in the processor 38, the derivation unit 38A derives the communication distance based on a result of wireless communication between the first wireless communication unit 48 and the remote operation unit 12. Then, the irradiation controller 38B executes the irradiation control according to the communication distance in a case where the irradiation start instruction 49B is received via the first wireless communication unit 48. The irradiation with the radiation by the device main body 11 is controlled according to the communication distance. Accordingly, it is possible to suppress the irradiation with the radiation that is not intended by the user.

Further, in the radiation irradiation device 10 according to the second modification example, the irradiation control by the irradiation controller 38B includes prohibiting the irradiation with the radiation in a case where the communication distance is equal to or less than a predetermined value. In a case where a distance between the remote operation unit 12 and the device main body 11 is equal to or less than a predetermined distance, the irradiation with the radiation is prohibited even in a case where the irradiation start instruction 49B is received. Accordingly, it is possible to suppress the irradiation with the radiation that is not intended by the user.

For example, the fact that the remote operation unit 12 and the device main body 11 are within a predetermined distance range in a state in which the user holds the remote operation unit 12 means that the user is at a position close to the device main body 11. In a case where the radiation is emitted in this state, there is a risk that the irradiation with the radiation which is not intended by the user may occur, for example, the user who is located close to the device main body 11 may be exposed to the radiation to some extent. In the present configuration, in a case where the remote operation unit 12 and the device main body 11 are within a predetermined range, the irradiation with the radiation is prohibited by the irradiation controller 38B even in a case where the irradiation start instruction 49B is received. Therefore, the irradiation with the radiation unintended by the user is suppressed.

Third Modification Example

In the second modification example described above, although an example of a form in which the irradiation with the radiation is prohibited as the irradiation control has been described, the technology of the present disclosure is not limited thereto. In the third modification example, the irradiation control includes warning whether or not to emit the radiation.

Figure 9:
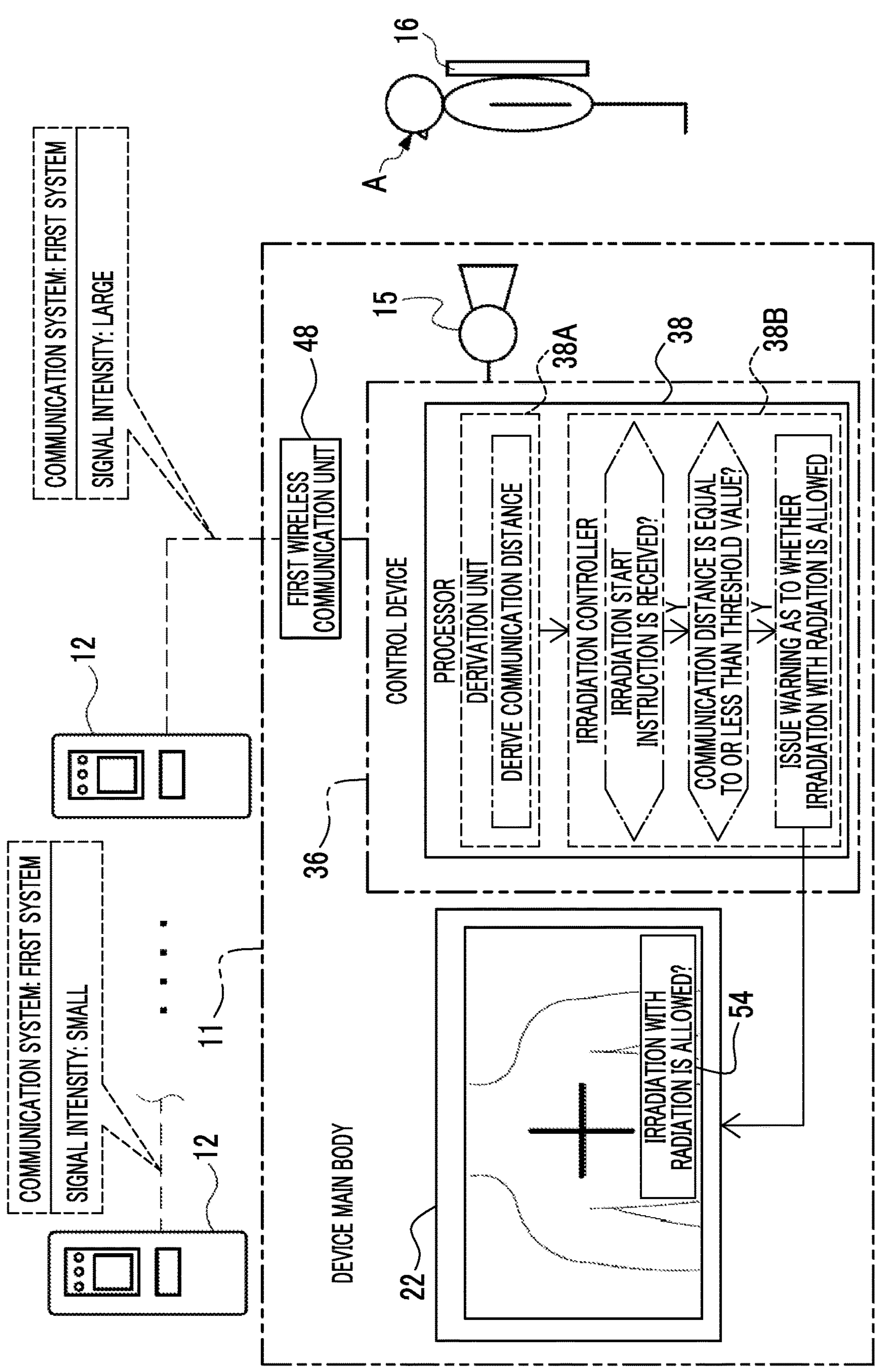
FIG. 9 is a conceptual diagram showing an example of contents of processing of the derivation unit and the irradiation controller.

As shown in FIG. 9 as an example, the derivation unit 38A derives a communication distance based on a result of wireless communication between the remote operation unit 12 and the first wireless communication unit 48. The derivation unit 38A derives the communication distance based on a signal intensity of a signal for distance derivation transmitted from the remote operation unit 12. For example, the derivation unit 38A derives the communication distance according to the signal intensity by using the distance derivation table and outputs the communication distance to the irradiation controller 38B.

The irradiation controller 38B determines whether or not the irradiation start instruction has been received from the remote operation unit 12 via the first wireless communication unit 48. In a case where the determination is affirmative, the irradiation controller 38B subsequently determines whether or not the communication distance acquired from the derivation unit 38A is equal to or less than a threshold value (for example, 5 m). In a case where the determination is affirmative, the irradiation controller 38B performs, as the irradiation control, control to issue a warning as to whether the irradiation with the radiation is allowed. Specifically, the irradiation controller 38B displays a warning message 54 on the display 22 even in a case where the irradiation start instruction is received. In the example shown in FIG. 9, an example is shown in which a text "Irradiation with radiation is allowed?" is displayed as the warning message 54. Thus, in a case where the remote operation unit 12 is within a predetermined range from the device main body 11, it is realized to check whether the user is allowed to be irradiated with the radiation.

As described above, in the radiation irradiation device 10 according to the third modification example, the irradiation control by the irradiation controller 38B includes issuing a warning as to whether the irradiation with the radiation is allowed in a case where the communication distance is equal to or less than a predetermined value. In a case where the distance between the remote operation unit 12 and the device main body 11 is equal to or less than a predetermined distance, a warning is issued as to whether irradiation with the radiation is allowed. The user can determine whether to perform or interrupt the irradiation with the radiation after checking the warning content. Accordingly, it is possible to suppress the irradiation with the radiation that is not intended by the user.

For example, the fact that the remote operation unit 12 and the device main body 11 are within a predetermined distance range in a state in which the user holds the remote operation unit 12 means that the user is at a position close to the device main body 11. In a case where the radiation is emitted in this state, the irradiation with the radiation that is not intended by the user may be performed. In the present configuration, in a case where the remote operation unit 12 and the device main body 11 are within a predetermined range, a warning is issued as to whether the irradiation with the radiation is allowed in a case where the irradiation start instruction 49B is received. As a result, the irradiation with the radiation that is not intended by the user is suppressed.

Fourth Modification Example

In the second modification example and the third modification example described above, although an example of a form in which in a case where the communication distance is equal to or less than a threshold value, prohibition of the irradiation with the radiation or issuing a warning as to whether the irradiation with the radiation is allowed is performed as the irradiation control has been described, the technology of the present disclosure is not limited thereto. In the fourth modification example, in a case where the communication distance is equal to or more than a threshold value, permission of the irradiation with the radiation is performed as the irradiation control.

Figure 10:
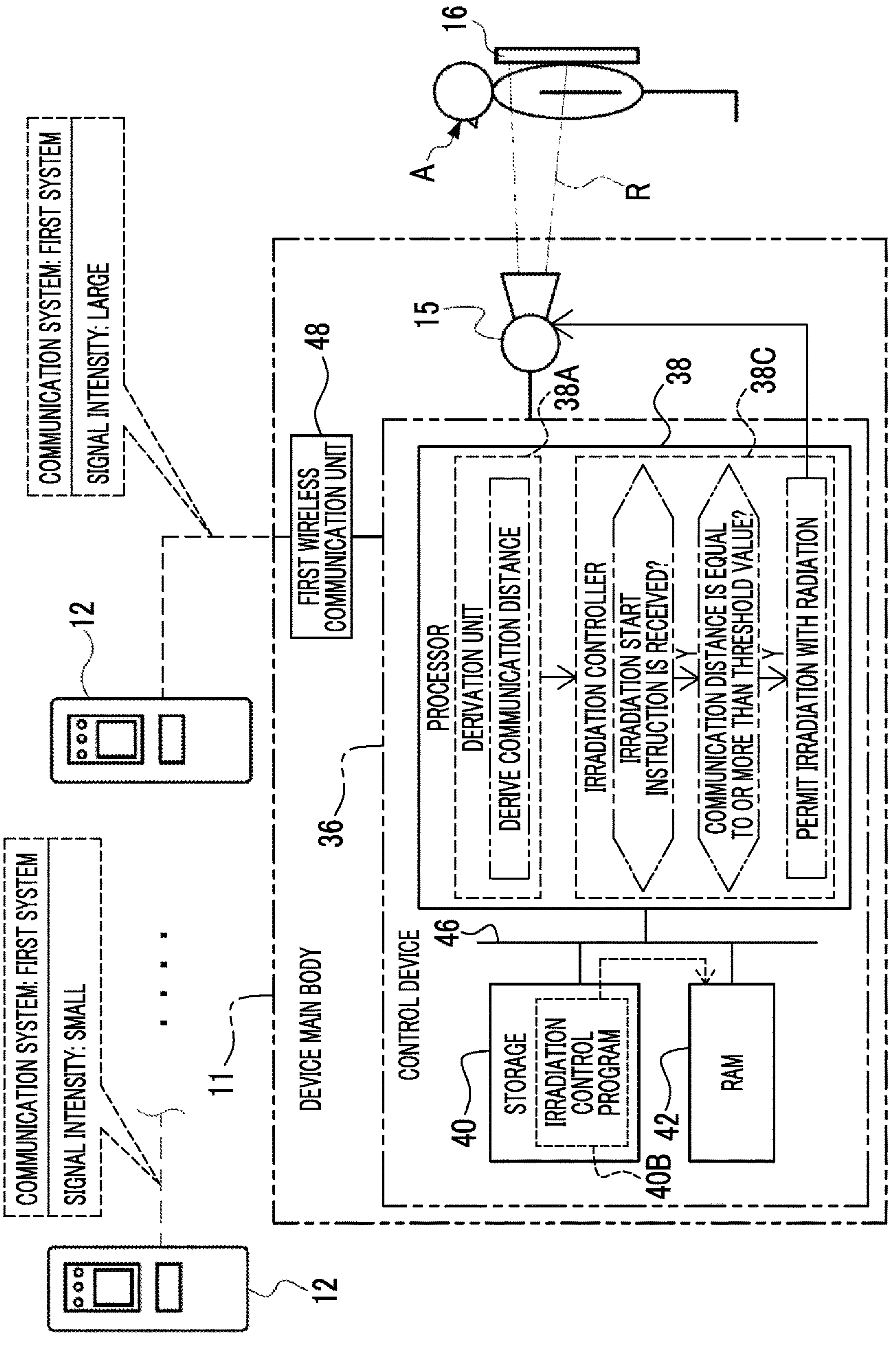
FIG. 10 is a conceptual diagram showing an example of contents of processing of the derivation unit and the irradiation controller.

As shown in FIG. 10 as an example, in the control device 36, the processor 38 reads out an irradiation control program 40B from the storage 40 and executes the read-out irradiation control program 40B on the RAM 42. Accordingly, the processor 38 operates as the derivation unit 38A and an irradiation controller 38C.

The derivation unit 38A derives the communication distance based on the result of wireless communication between the remote operation unit 12 and the first wireless communication unit 48. The derivation unit 38A derives the communication distance based on a signal intensity of a signal for distance derivation transmitted from the remote operation unit 12. For example, the derivation unit 38A derives the communication distance according to the signal intensity by using the distance derivation table and outputs the communication distance to the irradiation controller 38C.

The irradiation controller 38C determines whether or not the irradiation start instruction has been received from the remote operation unit 12 via the first wireless communication unit 48. In a case where the determination is affirmative, the irradiation controller 38C subsequently determines whether or not the communication distance acquired from the derivation unit 38A is equal to or more than a threshold value (for example, 5 m). In a case where the determination is affirmative, the irradiation controller 38C performs, as the irradiation control, control of permitting the irradiation with the radiation. Specifically, the irradiation controller 38C controls the radiation tube 15 such that the radiation R is emitted with a predetermined tube voltage, tube current, and irradiation time based on the irradiation start instruction.

As described above, in the radiation irradiation device 10 according to the fourth modification example, the irradiation control by the irradiation controller 38C includes permitting the irradiation with the radiation in a case where the communication distance is equal to or more than a predetermined value. In a case where the distance between the remote operation unit 12 and the device main body 11 is equal to or more than a predetermined distance, the irradiation controller 38C permits the irradiation with the radiation. Accordingly, it is possible to suppress the irradiation with the radiation that is not intended by the user.

For example, the fact that the remote operation unit 12 and the device main body 11 are outside a predetermined distance range in a state in which the user holds the remote operation unit 12 means that the user is at a position sufficiently separated from the device main body 11. In this state, even in a case where the radiation is emitted, an influence on the user is small. In the present configuration, in a case where the remote operation unit 12 and the device main body 11 are located outside a predetermined range, the irradiation with the radiation is permitted. As a result, the irradiation with the radiation that is not intended by the user is suppressed.

In the above embodiment, although Bluetooth (registered trademark) is illustrated as the first system which is a wireless communication system between the first wireless communication unit 48 and the remote operation unit 12, the technology of the present disclosure is not limited thereto. As the first system, Zigbee (registered trademark) or infrared communication may be used.

Moreover, in the above embodiment, an example of a form in which the irradiation control program 40A or 40B is stored in the storage 40 has been described, but the technology of the present disclosure is not limited thereto. For example, the irradiation control program 40A or 40B may be stored in a storage medium (not shown), such as an SSD or a universal serial bus (USB) memory. The storage medium is a portable computer-readable non-transitory storage medium. The irradiation control program 40A or 40B stored in the storage medium is installed in the radiation irradiation device 10. The processor 38 executes processing in accordance with the irradiation control program 40A or 40B.

Further, the irradiation control program 40A or 40B may be stored in a storage device of another computer, a server, or the like that is connected to the radiation irradiation device 10 via the network, and the irradiation control program 40A or 40B may be downloaded according to a request of the radiation irradiation device 10 and may be installed in the radiation irradiation device 10. That is, the program (program product) described in the present embodiment may be provided by the recording medium or in a form of being distributed from an external computer.

Moreover, in the above embodiment, although the processor 38, the storage 40, the RAM 42, and the external I/F 44 of the radiation irradiation device 10 are illustrated as a computer, the technology of the present disclosure is not limited thereto, and instead of the computer, a device including an application specific integrated circuit (ASIC), a field-programmable gate array (FPGA), and/or a programmable logic device (PLD) may be applied. Moreover, a hardware configuration and a software configuration may be used in combination, instead of the computer.

The following various processors can be used as hardware resources for executing the processing described in the above embodiment. Examples of the processor include a CPU which is a general-purpose processor functioning as the hardware resource for executing the processing by executing software, that is, a program. In addition, examples of the processor include a dedicated electric circuit which is a processor having a circuit configuration specially designed for executing specific processing, such as an FPGA, a PLD, or an ASIC. A memory is incorporated in or connected to any processor, and any processor uses the memory to execute the processing.

The hardware resource for executing the processing may be configured by one of these various processors, or may be configured by a combination (for example, a combination of a plurality of FPGAs or a combination of a CPU and an FPGA) of two or more processors of the same type or different types. Further, the hardware resource for executing the processing may be one processor.

As an example in which the hardware resource is configured with one processor, first, there is a form in which one processor is configured with a combination of one or more CPUs and software, and the processor functions as the hardware resource for executing the processing. Second, there is a form in which a processor that realizes functions of the entire system including a plurality of hardware resources for executing the processing with one integrated circuit (IC) chip is used, as typified by a system-on-a-chip (SoC). In this way, the processing is realized by using one or more of the various processors described above, as the hardware resource.

As a hardware structure of these various processors, more specifically, it is possible to use an electric circuit in which circuit elements, such as semiconductor elements, are combined. In addition, the image processing is merely an example. Therefore, it is needless to say that unnecessary steps may be deleted, new steps may be added, or a processing order may be changed without departing from the gist.

The above-described contents and illustrated contents are detailed descriptions of parts related to the technology of the present disclosure, and are merely examples of the technology of the present disclosure. For example, the above descriptions related to configurations, functions, operations, and advantageous effects are descriptions related to examples of configurations, functions, operations, and advantageous effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

Appendix 1

A radiation irradiation device comprising: a device main body that emits radiation; a display device that is provided in the device main body; a remote operation unit that is capable of remotely operating the device main body; a first wireless communication unit that wirelessly communicates first information including an operation instruction for operating the device main body by using a first wireless communication system, with the remote operation unit; and a second wireless communication unit that wirelessly communicates second information including information to be displayed on the display device by using a second wireless communication system, with an external device provided outside the device main body.

Appendix 2

The radiation irradiation device according to Appendix 1, in which the first wireless communication unit has a faster response speed than the second wireless communication unit.

Appendix 3

The radiation irradiation device according to Appendix 1 or 2, in which the first wireless communication unit has a smaller power consumption than the second wireless communication unit.

Appendix 4

The radiation irradiation device according to any one of Appendices 1 to 3, in which the first wireless communication unit has a shorter reachable distance of radio waves used for wireless communication than the second wireless communication unit.

Appendix 5

The radiation irradiation device according to any one of Appendices 1 to 4, in which the second wireless communication unit has a faster communication speed than the first wireless communication unit.

Appendix 6

The radiation irradiation device according to any one of Appendices 1 to 5, in which the operation instruction includes an irradiation start instruction for causing the device main body to start irradiation with the radiation.

Appendix 7

The radiation irradiation device according to any one of Appendices 1 to 6, in which the second information includes an optical image of a subject, a radiation image of the subject, and/or imaging information.

Appendix 8

The radiation irradiation device according to any one of Appendices 1 to 7, further comprising a processor, in which the processor is configured to: derive a distance between the device main body and the remote operation unit based on a result of wireless communication between the first wireless communication unit and the remote operation unit; and execute irradiation control according to the distance in a case where the irradiation start instruction is received.

Appendix 9

The radiation irradiation device according to Appendix 8, in which the irradiation control includes prohibiting the irradiation with the radiation or issuing a warning as to whether the irradiation with the radiation is allowed in a case where the distance is equal to or less than a predetermined value.

Appendix 10

The radiation irradiation device according to Appendix 8, in which the irradiation control includes permitting the irradiation with the radiation in a case where the distance is equal to or more than a predetermined value.

What is claimed is:

1. A radiation irradiation device comprising:

a device main body that emits radiation;

a display device that is provided in the device main body;

a remote operation unit that is capable of remotely operating the device main body;

a first wireless communication unit that wirelessly communicates first information including an operation instruction for operating the device main body by using a first wireless communication system, with the remote operation unit; and a second wireless communication unit that wirelessly communicates second information including information to be displayed on the display device by using a second wireless communication system, with a detector provided outside the device main body, the detector being movable independently of the device main body and configured to detect the radiation, wherein the operation instruction includes an instruction to cause the device main body to emit the radiation, and the remote operation unit does not wirelessly communicate with the detector.

2. The radiation irradiation device according to claim 1, wherein the first wireless communication unit has a faster response speed than the second wireless communication unit.

3. The radiation irradiation device according to claim 1, wherein the first wireless communication unit has a smaller power consumption than the second wireless communication unit.

4. The radiation irradiation device according to claim 1, wherein the first wireless communication unit has a shorter reachable distance of radio waves used for wireless communication than the second wireless communication unit.

5. The radiation irradiation device according to claim 1, wherein the second wireless communication unit has a faster communication speed than the first wireless communication unit.

6. The radiation irradiation device according to claim 1, wherein the operation instruction includes an irradiation start instruction for causing the device main body to start irradiation with the radiation.

7. The radiation irradiation device according to claim 6, further comprising a processor, wherein the processor is configured to:

derive a distance between the device main body and the remote operation unit based on a result of wireless communication between the first wireless communication unit and the remote operation unit; and execute irradiation control according to the distance in a case where the irradiation start instruction is received.

8. The radiation irradiation device according to claim 7, wherein the irradiation control includes prohibiting the irradiation with the radiation or issuing a warning as to whether the irradiation with the radiation is allowed in a case where the distance is equal to or less than a predetermined value.

9. The radiation irradiation device according to claim 7, wherein the irradiation control includes permitting the irradiation with the radiation in a case where the distance is equal to or more than a predetermined value.

10. The radiation irradiation device according to claim 1, wherein the second information includes an optical image of a subject, a radiation image of the subject, and/or imaging information.

* * * * *